US012801552B2

(12) United States Patent
Hartlieb et al.

(10) Patent No.: US 12,801,552 B2
(45) Date of Patent: Nov. 17, 2026

(54) SYSTEM ON CHIP WITH SAFE HARDWARE SUBSYSTEM

(71) Applicant: Infineon Technologies AG, Neubiberg (DE)

(72) Inventors: Heimo Hartlieb, Graz (AT); Jens Barrenscheen, Munich (DE); Gerald Derflinger, Gratwein-Straßengel (AT)

(73) Assignee: Infineon Technologies AG (DE)

( * ) Notice: Subject to any disclaimer, the term of this patent is extended or adjusted under 35 U.S.C. 154(b) by 31 days.

(21) Appl. No.: 18/903,605

(22) Filed: Oct. 1, 2024

(65) Prior Publication Data

US 2025/0117349 A1 Apr. 10, 2025

(30) Foreign Application Priority Data

Oct. 5, 2023 (DE) ........................ 102023127139.3

(51) Int. Cl.
*G06F 13/38* (2006.01)
*G06F 13/40* (2006.01)
(Continued)

(52) U.S. Cl.
CPC .......... *G06F 13/4068* (2013.01); *G06F 13/38* (2013.01); *G06F 21/30* (2013.01); (Continued)

(58) Field of Classification Search
None
See application file for complete search history.

(56) References Cited

U.S. PATENT DOCUMENTS

2004/0039919 A1* 2/2004 Takayama .............. G06Q 20/24 713/180
2004/0139352 A1* 7/2004 Shewchuk .............. H04L 63/20 726/9

(Continued)

FOREIGN PATENT DOCUMENTS

DE 112017004786 T5 6/2019
EP 3401183 A1 11/2018

*Primary Examiner* — Michael Sun
(74) *Attorney, Agent, or Firm* — Mueting Raasch Group

(57) ABSTRACT

A system includes a data bus and (at least) a first subsystem having a bus interface coupled to the data bus. The first subsystem is capable of operating in a safe state and in a normal state, and it includes a control logic configured to transition the first subsystem into the safe state in response to a configuration command. The first subsystem further includes at least one hardware module configured to generate a default-output in the safe state and a non-default output in the normal state; memory coupled to the bus interface and configured to receive configuration data for the hardware module from the data bus and to store the received configuration data; and a data validator configured to validate, while the first subsystem is in the safe state, the configuration data and to signal, to the control logic, whether the configuration data is valid. The control logic is configured to transition the first subsystem into normal state in response to the data validator signaling that the configuration data is valid, and the hardware module is configured to receive—in response to the data validator signaling that the configuration data is valid—the validated data and use it to generate the non-default output.

15 Claims, 3 Drawing Sheets

(51) Int. Cl.
*G06F 21/30* (2013.01)
*G06F 21/57* (2013.01)

(52) U.S. Cl.
CPC ............ *G06F 21/57* (2013.01); *G06F 21/572* (2013.01); *G06F 2213/40* (2013.01)

(56) References Cited

U.S. PATENT DOCUMENTS

| | | | | |
|---|---|---|---|---|
| 2005/0133582 | A1* | 6/2005 | Bajikar | G06Q 20/00<br>235/10 |
| 2007/0150731 | A1* | 6/2007 | Ohkoshi | H04L 9/32<br>713/168 |
| 2011/0113443 | A1* | 5/2011 | Yu | H04N 21/4623<br>725/31 |
| 2015/0186680 | A1* | 7/2015 | Johnson | G06F 21/1066<br>713/193 |
| 2017/0195298 | A1* | 7/2017 | Brand | H04L 9/0891 |
| 2018/0004979 | A1* | 1/2018 | Niell | G06F 21/70 |
| 2021/0006395 | A1* | 1/2021 | Durham | H04L 9/0861 |
| 2021/0342169 | A1* | 11/2021 | Heinrich | G06F 13/4027 |

* cited by examiner

SYSTEM ON CHIP WITH SAFE HARDWARE SUBSYSTEM

TECHNICAL FIELD

The present disclosure relates, in general, to integrated circuits (ICs), and particularly to integrated circuits with safe hardware subsystems that are designed to comply with certain requirements with regard to Functional Safety.

BACKGROUND

Modern ICs can include a significant amount of memory, multiple microprocessors or processor cores, and plurality of peripherals to provide system level functionality in a single IC. In other words, ICs may include more and more subsystems which are integrated on a chip and which are capable of carrying out different functions. Therefore, the ICs are also referred to as System-on-Chip (SoC). These individual subsystems may be connected together through one or more buses. Thus, modern ICs may offer more complex functionality than previous generations of ICs. Although this is beneficial for the end users because of the additional functionality provided by these ICs, configuring these ICs at start-up, however, has become more and more complex as the number of subsystems increases. This is particularly true for applications, in which safety aspects are paramount. For example, in many automotive systems, in which the automobile carries human passengers and/or valuable cargo, errors due to failures of subsystems of an IC can be dangerous.

SUMMARY

According to one embodiment a system includes a data bus and (at least) a first subsystem having a bus interface coupled to the data bus. The first subsystem is capable of operating in a safe state and in a normal state, and it includes a control logic configured to transition the first subsystem into the safe state in response to a configuration command. The first subsystem further includes at least one hardware module configured to generate a default-output in the safe state and a non-default output in the normal state; memory coupled to the bus interface and configured to receive configuration data for the hardware module from the data bus and to store the received configuration data; and a data validator configured to validate, while the first subsystem is in the safe state, the configuration data and to signal, to the control logic, whether the configuration data is valid. The control logic is configured to transition the first subsystem into normal state in response to the data validator signaling that the configuration data is valid, and the hardware module is configured to receive—in response to the data validator signaling that the configuration data is valid—the validated data and use it to generate the non-default output.

According to another embodiment, a system includes a data bus, a first subsystem and (at least) a second subsystem. The first subsystem includes a first bus interface coupled to the data bus and a key generator that is configured to generate a key and to transmit the key across the data bus via the first bus interface. The second subsystem includes a second bus interface, a data encoder, and a data source. The data encoder is used to receive data from the data source, to encode data using the key, and to transmit the encoded data to the first subsystem across the data bus. The first subsystem further comprises a control logic and memory that is coupled to the bus interface and configured to receive—from the data bus—the encoded data and to store the received data. The first subsystem further includes a data validator that is configured to decode and validate the received data stored in the memory using the key and to signal—to the control logic—whether or not the received data has been successfully decoded and validated. Furthermore, the control logic is configured to transition the first subsystem into a safe state when the data validator has not signaled a successful validation of received data for a predetermined time span.

Other embodiments relate to methods for operating a system including one or more safe hardware subsystems. In accordance with one embodiment a method includes: transitioning a hardware subsystem of the system into a safe state in response to a configuration command; receiving configuration data via a bus interface; and validating the received configuration data. When the configuration data has successfully been validated, the validated configuration data is forwarded to a hardware module of the hardware subsystem and the hardware subsystem is transitioned into a normal state, wherein the hardware module generates a default output in safe state and a non-default output in normal state. The non-default output depends on the configuration data.

In accordance with another embodiment, a method includes generating a key in a first subsystem the system; transmitting the key to a second subsystem of the system; and receiving—by the first subsystem—encoded data from the second subsystem, wherein the encoded data is generated in the second subsystem using the key. The method further includes validating the received data using the key in the first subsystem; using the validated data by a hardware module of the first subsystem to generate a non-default output when the validation of the data has been successful and the first subsystem is in a normal state; and transitioning the first subsystem into a safe state, when no data is received and successfully validated for more than a predetermined time, wherein the hardware module of the first subsystem generates a default output when the first subsystem is in the safe state.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
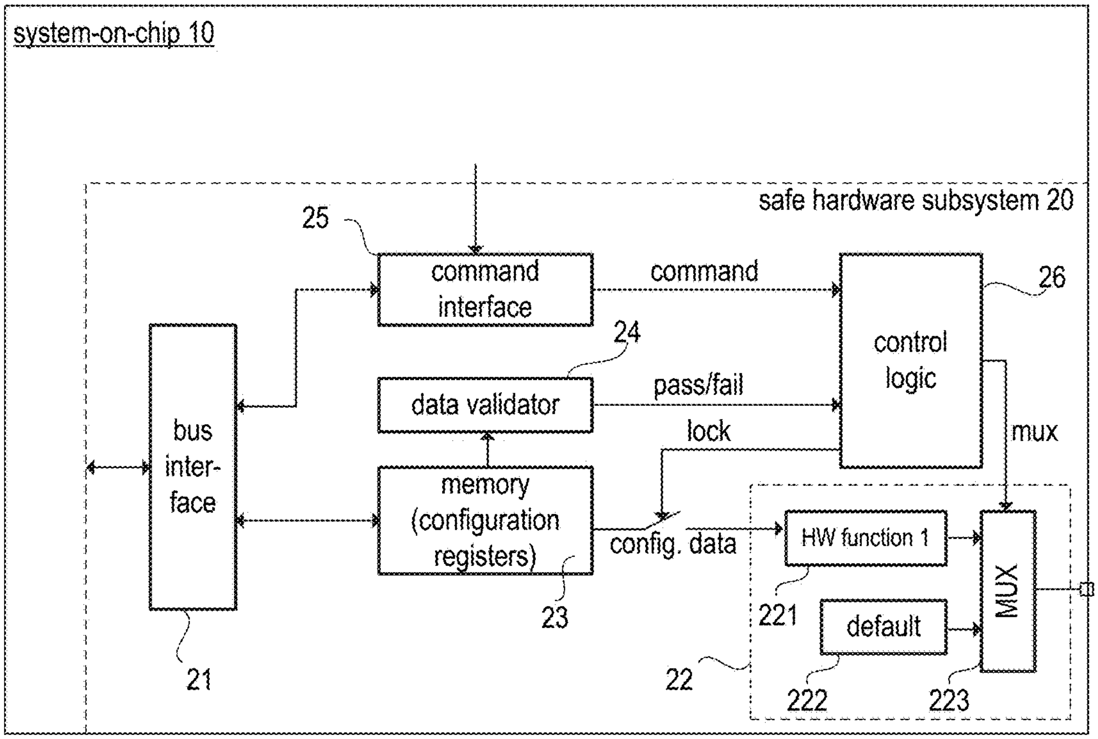
FIG. 1 illustrates one example of a system with a safe hardware subsystem communicating with another subsystem.

As mentioned above, aspects of Functional Safety are paramount in many applications, in which ICs are used. To quantify the level of risk, e.g. in automotive systems, the automotive industry uses Automotive Safety Integrity Level (ASIL), which is a risk classification scheme defined by the ISO 26262 standard (Road vehicles—Functional safety). Similar standards exist, e.g., in the field of aviation and other industries.

The ASIL is established by performing a risk analysis of a potential hazard by looking at the severity, exposure, and controllability of the vehicle operating scenario. The safety goal for that hazard determines the ASIL requirements. There are four ASILs identified by the standard: ASIL A, ASIL B, ASIL C, ASIL D. ASIL D dictates the highest integrity requirements on a product and ASIL A the lowest. Hazards that are identified as Quality Management (QM) do not dictate any safety requirements.

Generally, subsystems within a given IC of a semiconductor die are configured by programming data of the various modules, and more specifically by writing configuration data over a data bus (e.g. an Advanced Peripheral Bus, APB, if an Advanced Microcontroller Bus Architecture, AMBA, is used) to a bank of registers for each subsystem. For example, the configuration data can be stored in non-volatile memory and, upon start-up of the IC, the configuration data can be fetched from the non-volatile memory and written to various subsystems. The configuration data may adjust thresholds or set-points used by the various subsystems, or may define reactions that a subsystem performs, when certain events are detected by the subsystem or by other subsystems of the system.

In some cases, the integrated circuit may include sufficient non-volatile memory to store the configuration data and other needed content. However, the non-volatile memory and other circuitry may be manufactured according to a lower ASIL rating than is required for the overall IC/system or it may be integrated in a separate IC. For example, the non-volatile memory of the system can be designed according to QM standard (e.g., flash memory, but not radiation-hardened flash memory), whereas the data it contains may be used in other subsystems with higher ASIL ratings. To ensure the content of the configuration data is correct, various types of error detection and error correction are as such known, for example Cyclic Redundancy Check (CRC) or the like.

CRC and other techniques for error detection and/or correction are used to allow the identification of corrupted data or to even allow the correction of corrupted data in some cases (called ECC=error correction code). However, these techniques only confirm the correctness of the data as such (verification), but do not confirm whether that data is actually written to the correct location within the system (validation). Furthermore, these techniques do not automatically prevent correctly written data from being later modified in an undesired way.

FIG. 1 illustrates one example of a system with one or more safe hardware subsystems communicating with other circuitry, which may be designed in accordance with ASIL levels that are less strict than the ASIL level(s) of the safe subsystem(s). The system of FIG. 1 may be (but not necessarily is) a system-on-chip (SoC), which means that the subsystems are integrated in one semiconductor die or one chip package (system-in-package SiP).

In accordance with the example of FIG. 1, the safe hardware subsystem 20 includes a bus interface 21 and an optional command interface 25. Both interfaces, 21 and 25, allow communication with other circuitry (e.g. controller circuits, subsystem, other ICs, etc.). The bus interface 21 may be, for example, an Advanced Peripheral Bus (APB) if an ARM architecture is used. The command interface 25 may be, for example, a single data signal (e.g. a logic signal) or another communication interface, such as a Serial Peripheral Interface (SPI) or the like. It is noted, however, that many other types of suitable bus systems are as such known and thus are not further discussed herein. The command interface 25 is optional because commands may also be received via the bus interface 21. The command interface 25 may also be implemented by a simple signal input receiving a logic signal. In this example, the command is represented by a defined logic level of the received signal.

Data received via the bus interface 21 (e.g. from a controller circuit outside the safe hardware subsystem 20), in particular, configuration data, may be stored in a memory 23 of the safe hardware subsystem 20. The memory 23 may comprise, for example, a set of configuration registers, in which the configuration data are stored.

The safe hardware subsystem 20 further includes a control logic 26 and data validator 24, which is also referred to as configuration checker. The data validator 24 is configured to validate the data (or at least some of the data received via bus interface 21) stored in the memory 23 and to signal, to the control logic 26, whether the stored data is valid. In this context "valid" may not only refer to the fact that the integrity of the data has been verified using known methods (e.g., parity bits, CRC, error detecting codes (EDC) or error correcting codes (ECC), etc.) but also that the data has been written to the correct destination (address). Concepts for validating the stored data are as such known (e.g. from US 2023/0135490 A1) and thus not further discussed herein. The control logic 26 may receive commands via the command interface 25.

The safe hardware subsystem 20 further includes one or more hardware modules 22, which include a hardware (HW) function 221 (circuit performing a specific desired function) that generates an output. The output of a hardware module 22 depends on whether the safe hardware subsystem 20 is in a "safe operation" state (short "safe state") or in a "normal operation" state (short "normal state", also referred to as "mission state"). The current state (safe operation or normal operation) is indicated by the control logic 26. In the safe state, each hardware module 22 generates a desired default value 222 as output (default output). In the mission state, the hardware module(s) 22 may generate a (non-default) output value that depends on the (validated) configuration data stored in the memory 23. In the depicted example, the switchover between the default and the non-default output is accomplished by a multiplexer 223 that is controlled by the control logic 26. It is noted that other circuitry may be used instead of a multiplexer to achieve a similar or substantially the same result.

The example of FIG. 1 is further explained by reference to the flow chart depicted in FIG. 2. More specifically, the flow chart of FIG. 2 illustrates one example of how the safe hardware subsystem of FIG. 1 can be configured.

Figure 2:
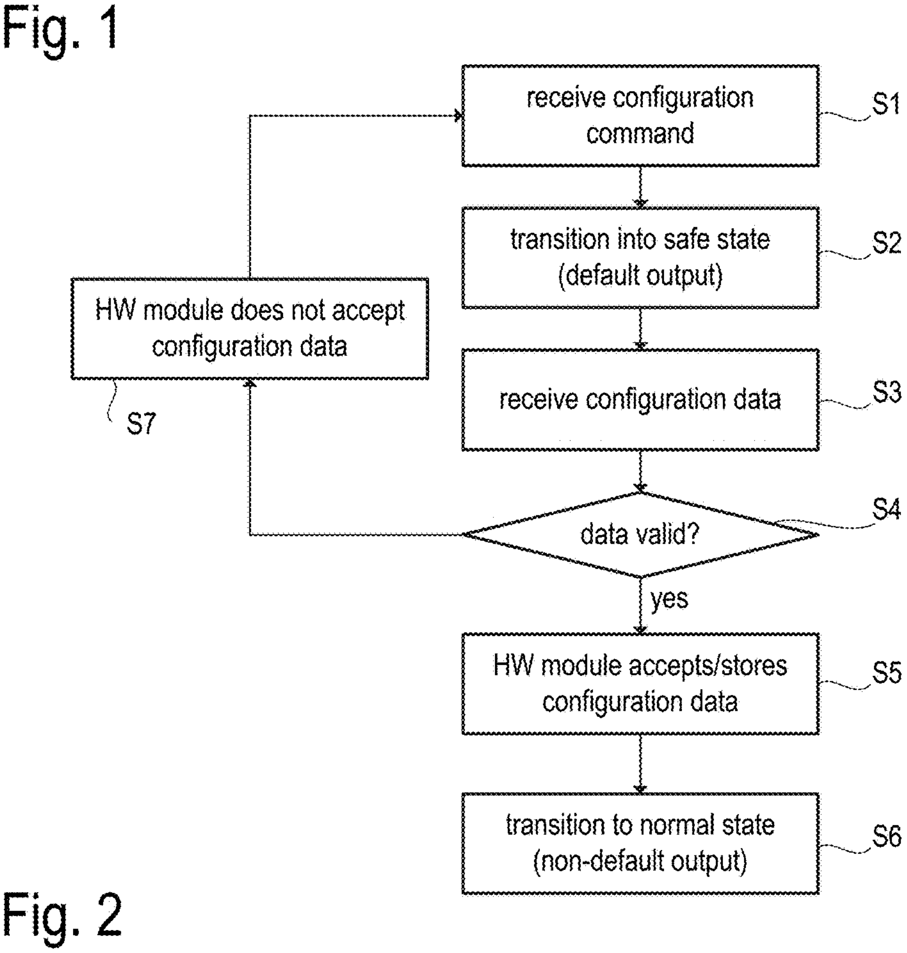
FIG. 2 illustrates a flow chart illustrating one example of how the safe hardware subsystem of FIG. 1 can be configured.

The configuration process of FIG. 2 is initiated by receiving a configuration command (see FIG. 2, step S1) by the control logic 26 via the command interface 25 (or via the bus interface 21 if a separate command interface is not provided). In response to the reception of the configuration command, the control logic 26 may trigger a transition into the safe operation (FIG. 2, step S2). To switch into the safe state, the control logic 26 drives the multiplexer 223 included in the hardware module 22 to output the default value 222. Furthermore, the control logic 26 unlocks the signal path between the memory 23 and the HW function 221 of the hardware module 22. It is noted that, if the safe hardware subsystem 20 already is in a safe state, no action is needed in step S2.

In the next step (FIG. 2, step S3), configuration data is received via the bus interface 21 and stored into the memory 23. The reception of the configuration data may be triggered by the control logic 26 as a response to receiving the configuration command. Alternatively, the reception of the configuration data may be triggered by a controller (outside the safe hardware subsystem) that sends the configuration command or by other circuitry outside the safe hardware subsystem 20. The configuration data may be received before, during or after the transition into the safe state???. The received configuration data is then validated (FIG. 3, step S4) as discussed above (cf. FIG. 1, data validator/configuration checker 24). If the validation is positive (configuration data valid), the hardware module is 22 is configured (see FIG. 3, step S5) using the validated date (or parts thereof). For example, the configuration data, or data derived therefrom, may be copied to one or more registers of the hardware function 222 via the unlocked signal path. This step S5 requires that the safe hardware subsystem is in the safe state, because only in safe state the signal path between the memory 23 and the hardware module 22 is unlocked. It is noted that the lock mechanism shown in FIG. 1 is merely an example and various other known lock mechanisms may be used instead. However, it is important that the safety-relevant part of the configuration of the hardware module 22 cannot be modified during normal operation (in mission state).

Figure 3:
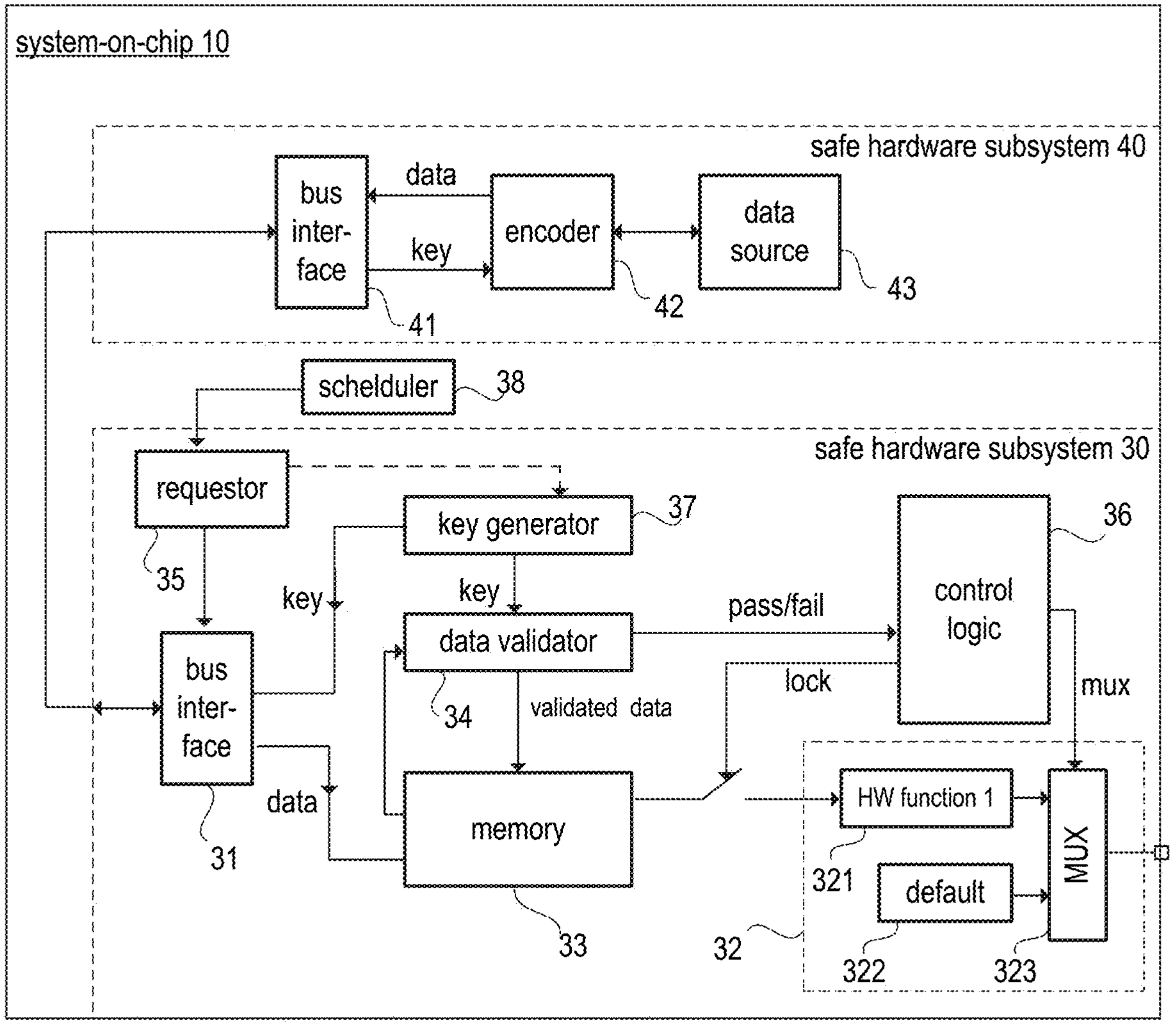
FIG. 3 illustrates another example of a system with a safe hardware subsystem.

Once the hardware module 22 has accepted (and stored) the new/updated (and previously validated) configuration data, the control logic 26 may trigger a transition into the mission state (FIG. 3, step S6). This switchover to the mission state entails driving the multiplexer 223 to switch back to the non-default output and to lock the signal path between memory 23 and the hardware module 22 to disable modification of the configuration date stored in and used by the hardware function 221. As mentioned, the non-default output depends on the configuration data.

If the validation of the received configuration data fails (in step S4), then the hardware module 22 does not accept and store the configuration data (FIG. 3, step S7), or simply ignores the configuration data. In this case, the safe hardware module 20 continues to operate in the safe state. Another configuration process may be triggered by another configuration command.

The concept of a safe hardware subsystem allows a safe configuration of the hardware modules residing in the safe hardware subsystem. In this context, safe configuration means that the outputs provided by the hardware modules (see FIG. 1, hardware modules 22) are in a defined state during configuration and the outputs cannot—by design—provide unpredictable values or signal levels due to incorrect configuration data. The concept described herein also allows to design and certificate the safe hardware subsystem in accordance with a desired ASIL level while the rest of the chip may be designed for lower safety integrity levels. A certified safe hardware subsystem design may be reused in other chips/systems.

Figure 4:
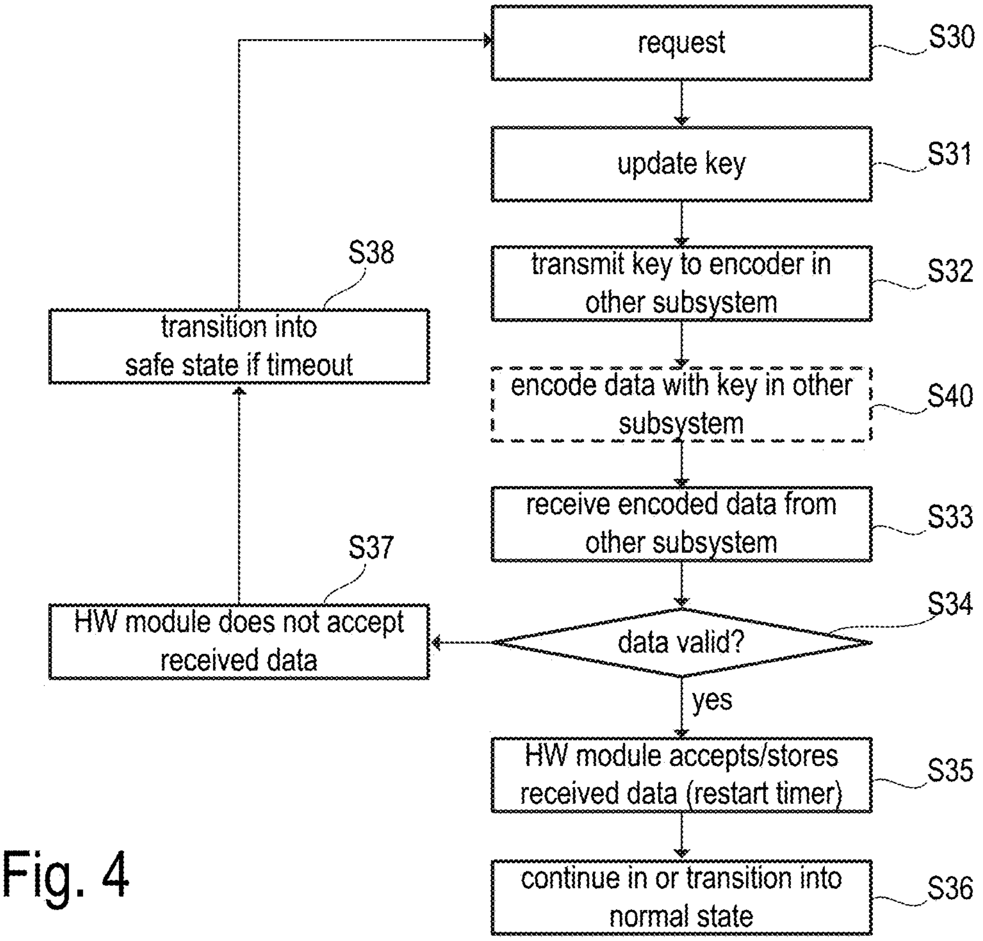
FIG. 4 illustrates a flow chart illustrating one example of how the safe hardware subsystem of FIG. 3 receives and validates data from another subsystem.

FIG. 3 illustrates another example of a system with a safe hardware subsystem communicating with another subsystem. As shown in FIG. 4 the system 10 includes two (or more) safe hardware subsystems. A first safe hardware subsystem 30 includes a bus interface 31 for receiving data from another subsystem, a memory 33 for storing received data (in particular configuration data), a control logic 36 and one or more hardware modules 32. Like in the previous example, the bus interface 31 may be, for example, an Advanced Peripheral Bus (APB) if an ARM architecture is used. However, many other types of suitable bus systems are as such known. The memory 33 may comprise, for example, a set of configuration registers, in which the configuration data are stored.

The hardware module(s) 32 may be designed in substantially the same way as the modules 22 discussed above with reference to FIGS. 1 and 2. It includes a configurable hardware function 321, which produces a non-default output, a default function 322, which produces a safe (predefined, e.g. constant) default output, and a multiplexer 323, which allows the control logic 36 to select either the non-default output or the default output dependent on the state of the safe hardware subsystem 30 (safe state or mission state). The control logic 36 has a very similar purpose and function as the logic circuit 26 discussed above with reference to FIG. 1.

The difference between the safe hardware subsystem 20 of FIG. 1 and the safe hardware subsystem 30 of FIG. 2 is basically in the way the received data is validated. As shown in FIG. 3, the data validator 34 included in the safe hardware subsystem 30 uses a key that is generated by a key generator 37 for data validation. The key may be a sequence of digits (e.g. a 32 bit word) stored in one or more registers of the data validator 34. The sequence of digits may represent a random (e.g. a pseudo-random) number. Many different ways for generating pseudo-random numbers (e.g. linear-feedback shift register, LFSR) are as such known and thus not further discussed herein. The key may comprise timing information, such as a local time of a scheduler. The timing information may be used to check whether configuration (or other control data) are relevant for the operation of a subsystem or outdated. The key may be updated for each transmission of data via the bus interface 21, wherein a transmission may comprise a data frame/packet or a group of data frames/packets.

A transmission may be triggered by a command (request command or simply request) like in the previous example discussed above with reference to FIGS. 1 and 2. In the present example of FIG. 3 the requests are generated by a requestor 35. The requestor 35 may generate requests regularly (periodically or from time to time), e.g. in accordance with a schedule. In the present example, a scheduler 38 causes the requestor 35 to generate a new request in accordance to a predefined plan (schedule). The concept of a scheduler and its function is as such known and thus not explained herein in more detail. For the embodiments discussed herein it is not so important how a data transmission is triggered. Rather, emphasis is put on the data transmission itself and the validation of the received data. In another example, a scheduled request may open a time window for a configuration update in a first subsystem and trigger a data transfer from a second subsystem to the first subsystem.

Before the data transmission is explained in more detail, it is briefly discussed where the data comes from. In the depicted example, the system 10 includes a further safe hardware subsystem 40, which includes (inter alia) a bus interface 41, which is coupled to the bus interface 31 of subsystem 30 via one or more bus lines, a data encoder 42 and a data source 43. The bus interface 41 may be of the same type as the bus interface 31.

For the discussion of the embodiments, the specific implementation of the data source 43 is not important. For example, the data source 43 may include a sensor which regularly outputs measured sensor data. However, other embodiments may use a different data source such as, for example, a communication interface, a (volatile or non-volatile) memory, a processor, etc.

FIG. 4 illustrates a flow chart illustrating one example of how the safe hardware subsystem of FIG. 3 receives and validates data from another subsystem. For the present discussion, it is assumed that—when the safe hardware subsystem 30 operates in mission state—the hardware module(s) 32 (see FIG. 3) require(s) up-to-date data from the data source 43 (e.g. sensor data) for a reliable operation. If—for whatever reason—no valid data is received from the data source 43 by the subsystem 30 for a specific time, the subsystem will transition into the safe state.

The process shown in FIG. 4 starts with the generation of a new request (FIG. 4, step S30) by the requestor 35 (see FIG. 3). As mentioned above, a request may be issued regularly by scheduler 38. In response to the request a new key will be generated (FIG. 4, step S31) by key generator 37. The new key may overwrite the existing key which is thereby updated. Further, the key may be transmitted, e.g. via the communication interfaces 21 and 41, to the encoder 42 in the other safe hardware subsystem 40 (FIG. 4, step S32). The encoder 42 uses the updated key for encoding the data currently provided by the data source 43 (FIG. 4, step S40) and the encoded data is transmitted to the safe hardware subsystem 30. Accordingly, the subsystem 30 receives, via the communication interfaces 41 and 21, the encoded data (FIG. 4, step S33), which is stored in the memory 33 (see FIG. 3).

The received data is then validated by the data validator 34, which uses the key (previously sent to the encoder 43) to decode/validate the data (FIG. 4, step S34). If the data validation is successful, the hardware module(s) 32 will accept and use the received (and validated) data (FIG. 4, step S35), and the operation of the safe hardware subsystem 30 may continue in mission state (FIG. 4, step 36), in which the output of the hardware module(s) 32 may depend on the received data.

If the validation fails, the hardware module(s) 32 will not accept (and thus not use the) received data (FIG. 4, step S34). For example, the control logic 36 will lock the signal path between the memory 33 and the hardware module(s) 32, which may continue normal operation for a short time using existing (potentially outdated) data. However, if no valid data is received for a defined time a timeout may occur and the control logic 36 may force the subsystem 30 to transition into safe state (FIG. 4, step S38). In this case the subsystem 30 will continue to operate in the safe state, in which the hardware module(s) 32 provide the default output as discussed further above with reference to FIGS. 1-3.

In view of the above discussion, it is clear that the system inevitably transitions into the safe state (in which all hardware module(s) 32 generate default output) in response to a timeout as soon as no valid data is received for a defined time span. A backwards-counting (in synchronization with a clock signal) counter may be used as a timer, which is set to a defined counter value when started or restarted, and which signals a timeout when the counter value reaches zero. The timer may be started upon startup of the subsystem 30 and restarted upon a successful validation of newly received data. Accordingly, a timeout will never occur if new data can be successfully validated before the timer has counted down to zero. However, if the timer reaches zero, the subsystem 30 will transition into safe state and remain in safe state until new data is successfully validated. The timer may be included in the control logic 36. The transition of a subsystem into safe state may be indicated to other parts of the system, e.g. to trigger remedial actions.

An unsuccessful validation of received data can have different reasons. First, either the key or the respective encoded data may have been corrupted during data transmission. Second, the subsystem 40 may be defective and thus unable to respond to the updated key. As a consequence, the subsystem 40 uses an outdated key to encode new data. Third, the key generator 37, the data validator or the bus interfaces may be defective.

Encoding data (as performed by encoder 42 of subsystem 40) may be accomplished in various ways. For example, a hash value may be calculated from a concatenation of data and the current key and the hash value may be appended to the data. The data validator 34 may perform the same operation and check whether the calculated hash value and the received hash value match. Alternatively, a CRC value may be calculated based on a concatenation of data and the current key. A skilled person will contemplate various other options dependent on the requirements of the actual application.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A system, comprising:

a data bus;

a first subsystem having a bus interface coupled to the data bus, wherein the first subsystem is capable of operating in a safe state and in a normal state and comprises:

a control circuit configured to control a multiplexer and transition the first subsystem into the safe state in response to a configuration command;

at least one hardware module comprising a hardware function circuit and the multiplexer and configured to generate a default-output in the safe state and a non-default output in the normal state;

memory coupled to the bus interface and configured to receive configuration data for the hardware module from the data bus and to store the received configuration data;

a data validator configured to validate, while the first subsystem is in the safe state, the configuration data and to signal, to the control logic whether the configuration data is valid, wherein the control circuit is configured to transition the first subsystem into normal state in response to the data validator signaling that the configuration data is valid; and wherein the hardware module is configured to receive—in response to the data validator signaling that the configuration data is valid—the validated data and use it to generate the non-default output.

2. The system of claim 1, wherein the hardware module is configured to not allow, in the normal state, a modification of the configuration data, which is used to generate the non-default output.

3. The system of claim 1, wherein the hardware module is configured to generate the non-default output independent form the configuration data.

4. The system of claim 1, wherein the first subsystem comprises a command interface; and wherein the command interface is further configured to cause the control circuit transition the first subsystem into save state upon receiving a configuration command via the command interface.

5. The system of claim 1, wherein the control logic is configured to prevent the hardware module from allowing a modification of the configuration data, which is used to generate the non-default output in normal state.

6. The system of claim 1, wherein the control circuit is configured to prevent the hardware module from using data, which has not been successfully validated, to generate non-default output.

7. A system, comprising:

a system-on-chip or a system-in-package that includes:

a data bus;

a first hardware subsystem having a first bus interface coupled to the data bus, wherein the first subsystem comprises a key generator configured to generate a key and to transmit the key across the data bus via the bus interface;

a second hardware subsystem having a second bus interface, a data encoder, and a data source, wherein the data encoder is used to receive data from the data source, encode data using the key and to transmit the encoded data to the first hardware subsystem across the data bus;

wherein the first hardware subsystem further comprises:

a control circuit, a memory coupled to the bus interface and configured to receive, from the data bus, the encoded data and to store the received data;

a data validator configured to decode and validate the received data stored in the memory using the key and to signal, to the control logic, whether or not the received data has been successfully decoded and validated, and wherein the control circuit is configured to control a multiplexer to transition the first hardware subsystem into a safe state when the data validator has not signaled a successful validation of received data for a predetermined time span.

8. The system of claim 7, wherein the key generator of the first hardware subsystem is configured to generate and transmit a new key for each data frame of the data to be encoded and transmitted by the encoder of the second hardware subsystem.

9. The system of claim 8, wherein the key is a random number.

10. The system of claim 7, wherein the first hardware subsystem further comprises:

a requestor configured to regularly generate a request command, wherein the key generator generates a new key in response to each request command.

11. The system of claim 7, wherein the first hardware subsystem further comprises:

at least one hardware module, which is configured to generate a default output in safe state and a non-default output in normal state, wherein the non-default output depends on the data decoded and validated by the data validator.

12. A method comprising:

transitioning a hardware subsystem of a system into a safe state in response to a configuration command;

receiving configuration data via a bus interface;

validating the received configuration data;

when the configuration data has successfully been validated:

forwarding the validated configuration data to a hardware module of the hardware subsystem and transition the hardware subsystem into a normal state, wherein the hardware module includes a hardware function circuit and a multiplexer and generates a default output in safe state and a non-default output, which depends on the configuration data, in normal state.

13. The method of claim 12, wherein the hardware module does not allow, in the normal state, a modification of the configuration data, which is used to generate the non-default output.

14. A method comprising:

generating a key in a first hardware subsystem of a system comprising a system-on-chip or a system-in-package;

transmitting the key to a second hardware subsystem of the system;

receiving encoded data from the second hardware subsystem, wherein the encoded data has been generated in the second subsystem using the key;

validating the received data using the key in the first hardware subsystem;

using the validated data by a hardware module of the first hardware subsystem to generate a non-default output when the validation of the data has been successful and the first hardware subsystem is in a normal state; and transitioning the first hardware subsystem into a safe state when no data is received and successfully validated for more than a predetermined time, wherein the hardware module of the first hardware subsystem includes a hardware function circuit and a multiplexer and generates a default output when the first subsystem is in the safe state.

15. The method of claim 14, wherein the first hardware subsystem regularly generates and transmits a new key for the data to be encoded and transmitted by the second subsystem.

* * * * *